United States Patent
Jeong et al.

(10) Patent No.: US 9,823,483 B2
(45) Date of Patent: Nov. 21, 2017

(54) IMAGE DISPLAY DEVICE USING DIFFRACTIVE ELEMENT

(71) Applicant: Samsung Display Co., Ltd, Yongin-si, Gyeonggi-do (KR)

(72) Inventors: Seung Jun Jeong, Hwaseong-si (KR); Hae Young Yun, Suwon-si (KR); Seung-Hoon Lee, Hwaseong-si (KR); Il-Yong Yoon, Bucheon-si (KR); Jin Hwan Kim, Suwon-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/992,737

(22) Filed: Jan. 11, 2016

(65) Prior Publication Data
US 2016/0124237 A1    May 5, 2016

Related U.S. Application Data

(63) Continuation of application No. 13/193,104, filed on Jul. 28, 2011, now Pat. No. 9,256,075.

(30) Foreign Application Priority Data

Dec. 28, 2010   (KR) .................. 10-2010-0136966

(51) Int. Cl.
  *G02F 1/1333*   (2006.01)
  *G02B 27/22*    (2006.01)
        (Continued)

(52) U.S. Cl.
  CPC ....... *G02B 27/2214* (2013.01); *G02B 5/1828* (2013.01); *G02B 5/1842* (2013.01);
        (Continued)

(58) Field of Classification Search
  CPC .......... G02B 27/2214; G02B 27/4205; G02B 5/1828; G02B 5/1842; G02B 5/1876;
        (Continued)

(56) References Cited

U.S. PATENT DOCUMENTS 7,775,666 B2   8/2010   Kubara et al.
7,872,694 B2   1/2011   Im
        (Continued)

FOREIGN PATENT DOCUMENTS

CN      101025490 A     8/2007
CN      101285938 A     10/2008
        (Continued)

*Primary Examiner* — James Dudek
(74) *Attorney, Agent, or Firm* — Innovation Counsel LLP

(57) ABSTRACT

An image display device includes a display panel displaying an image, and a diffractive element formed to operate in a 2D mode or a 3D mode so that the image of the display panel is perceived as a 2D image or a 3D image after passing through the diffractive element. In the image display device, the diffractive element includes a first substrate and a second substrate facing each other, a first electrode layer formed on the first substrate that includes a plurality of zones, a second electrode layer formed on the second substrate, and a liquid crystal layer interposed between the first substrate and the second substrate. Further, when the diffractive element operates in the 3D mode, a common voltage is applied to the second electrode layer, and polarity of voltages applied to the first electrode layer with respect to the common voltage is inverted every zone.

20 Claims, 10 Drawing Sheets

(51) Int. Cl.
*H04N 13/04* (2006.01)
*G02F 1/1343* (2006.01)
*G02F 1/29* (2006.01)
*G02B 27/42* (2006.01)
*G02B 5/18* (2006.01)

(52) U.S. Cl.
CPC ......... *G02B 5/1876* (2013.01); *G02B 5/1885* (2013.01); *G02B 27/4205* (2013.01); *G02F 1/133345* (2013.01); *G02F 1/134309* (2013.01); *G02F 1/292* (2013.01); *H04N 13/0404* (2013.01); *H04N 13/0452* (2013.01); *H04N 13/0454* (2013.01)

(58) Field of Classification Search
CPC ............. G02B 5/1885; G02F 1/133345; G02F 1/134309; G02F 1/292; H02N 13/0404; H02N 13/0452; H02N 13/0454
See application file for complete search history.

(56) References Cited

U.S. PATENT DOCUMENTS

| | | |
|---|---|---|
| 8,300,206 B2 | 10/2012 | Kim et al. |
| 2006/0164593 A1 | 7/2006 | Peyghambarian et al. |
| 2006/0209066 A1 | 9/2006 | Kubara et al. |
| 2007/0296911 A1 | 12/2007 | Hong |
| 2008/0252720 A1 | 10/2008 | Kim et al. |
| 2009/0122210 A1 | 5/2009 | Im |
| 2010/0026920 A1* | 2/2010 | Kim .................. H04N 13/0404 349/15 |
| 2010/0245743 A1 | 9/2010 | Yokoyama |

FOREIGN PATENT DOCUMENTS

| | | |
|---|---|---|
| JP | 11-133449 | 5/1999 |
| JP | 2003-177356 | 6/2003 |
| JP | 2004-101885 | 4/2004 |
| JP | 2004-334031 | 11/2004 |
| JP | 2006-259058 | 9/2006 |
| JP | 2008-529064 | 7/2008 |
| JP | 2008-216626 | 9/2008 |
| JP | 2009-104137 | 5/2009 |
| KR | 1020090004006 A | 1/2009 |
| KR | 10-2009-0040587 A | 4/2009 |
| KR | 1020100013179 A | 2/2010 |
| KR | 1020110104701 A | 9/2011 |
| WO | 2009/072670 | 6/2009 |

* cited by examiner

IMAGE DISPLAY DEVICE USING DIFFRACTIVE ELEMENT

CROSS-REFERENCE TO RELATED APPLICATION

This application is a continuation application of U.S. patent application Ser. No. 13/193,104 filed on Jul. 28, 2011, which claims priority to Korean Patent Application No. 10-2010-0136966 filed in the Korean Intellectual Property Office on Dec. 28, 2010, and all the benefits accruing therefrom under 35 U.S.C. §119, the contents of the prior applications being herein incorporated by reference.

BACKGROUND OF THE INVENTION (a) Field of the Invention

The present invention relates to an image display device using a diffractive element.

(b) Description of the Related Art

In recent years, 3D stereoscopic image display devices have attracted interest, and various 3D image display methods have been researched.

One of the most generally used methods for displaying stereoscopic images is binocular disparity. In binocular disparity, an image which reaches a left eye and an image which reaches a right eye are displayed in the same display device. The two images are reach the left eye and the right eye of an observant the same time from different angles, and as a result the observer perceives a 3D effect.

In this case, producing separate images for the left eye and the right eye is accomplished using either a barrier over pixels and a lenticular lens, which is a kind of cylindrical lens over pixels.

A stereoscopic image display device that uses the barrier forms a slit on the barrier and divides the image from the display device into a left-eye image and a right-eye image through the slit to be inputted into the left eye and the right eye of the observer, respectively.

A stereoscopic image display device that uses the lens displays the left-eye image and the right-eye image and divides the image from the stereoscopic image display device into the left-eye image and the right-eye image by changing a light path through the lens.

It is desirable to have a display device that can change the viewing mode from 2D image display methods to stereoscopic image display methods. Such 2D-to-3D image displays are being developed, and to this end, switchable lenses are being developed.

The above information disclosed in this Background section is only for enhancement of understanding of the background of the invention and therefore it may contain information that does not form the prior art that is already known in this country to a person of ordinary skill in the art.

SUMMARY OF THE INVENTION

An image display device having improved lens characteristics is provided.

An image display device includes a display panel displaying an image, and a diffractive element formed to operate in a 2D mode or a 3D mode so that the image of the display panel is perceived as a 2D image or a 3D image after passing through the diffractive element. In the image display device, the diffractive element includes a first substrate and a second substrate facing each other, a first electrode layer formed on the first substrate that includes a plurality of zones, a second electrode layer formed on the second substrate, and a liquid crystal layer interposed between the first substrate and the second substrate. Further, when the diffractive element operates in the 3D mode, a common voltage is applied to the second electrode layer, and polarity of voltages applied to the first electrode layer with respect to the common voltage is inverted every zone.

When the diffractive element operates in the 3D mode, the diffractive element may include a plurality of unit lenses.

Each of the plurality of unit lenses may operate as a Fresnel zone plate.

Each of the plurality of unit lenses may include a plurality of the zones sequentially positioned about a center of the unit lens.

The first electrode layer may include a first electrode array including a plurality of the first electrodes, a second electrode array including a plurality of the second electrodes, and an insulating layer insulating the first electrode array and the second electrode array from each other.

Each of the plurality of zones may include at least one first electrode and at least one second electrode.

The voltages may be applied to the first electrode layer so that a phase delay in each of the plurality of zones changes in a step-wise fashion across the zone.

Each zone includes one or more subzones corresponding to positions of the first and second electrodes, and the voltages for causing the same phase delay may be applied to the first electrodes or the second electrodes corresponding to the same subzones of the plurality of zones.

The voltages applied to the at least one first electrode and the at least one second electrode in each of the plurality of zones may change across each of the zones in a step-wise fashion.

The widths of the at least one first electrode and the at least one second electrode may increase across the zone.

In each of the plurality of zones, differences between voltages applied to the at least one first electrode and the at least one second electrode and the common voltage may gradually decrease across each zone.

In the first electrode layer, a voltage difference dV between voltages applied to two electrodes adjacent to each other at the boundary of zones may be set by a difference dVmax between a first voltage applied to an electrode of each zone positioned closest to an outer position with respect to the center of the unit lens and a second voltage applied to an electrode of each zone positioned closest to a position nearest the center of the unit lens, and an offset voltage Voffset which is a difference between the second voltage and the common voltage.

In the first electrode layer, the voltage difference dV between voltages applied to the two electrodes adjacent to each other at the boundary of the zones may satisfy dV=dVmax+2Voffset.

In the first electrode layer, a voltage difference dV applied to two electrodes adjacent to each other at the boundary of zones may be set so that transmittance of a zone boundary portion becomes a predetermined value or less.

An interval between two electrodes adjacent to each other at a boundary zone and a cell gap may be set so that transmittance of the zone boundary becomes a predetermined value or less.

Each of the plurality of zones may include two first electrodes and two second electrodes.

Each of the plurality of zones may include two first electrodes and one second electrode or may include one first electrode and two second electrodes.

Edges of a first electrode and a second electrode adjacent to each other may be arranged so as to not overlap each other.

When the diffractive element operates in the 2D mode, the diffractive element may transmit the image displayed on the display image as it is.

The image display device may further include an alignment layer configured to align liquid crystal molecules of the liquid crystal layer.

DETAILED DESCRIPTION OF THE EMBODIMENTS

Figure 1:
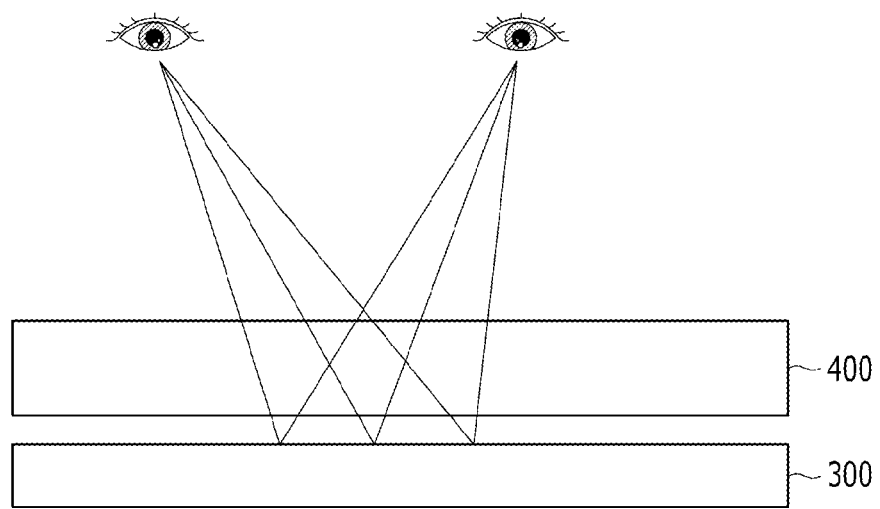
FIGS. 1 and 2 are schematic views illustrating a configuration of an image display device according to an exemplary embodiment of the present invention and methods of forming a 2D image and a 3D image, respectively.

The present disclosure will be described more fully hereinafter with reference to the accompanying drawings, in which exemplary embodiments are shown. As those skilled in the art would realize, the described embodiments may be modified in various different ways, all without departing from the spirit or scope of the present disclosure.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

Figure 2:
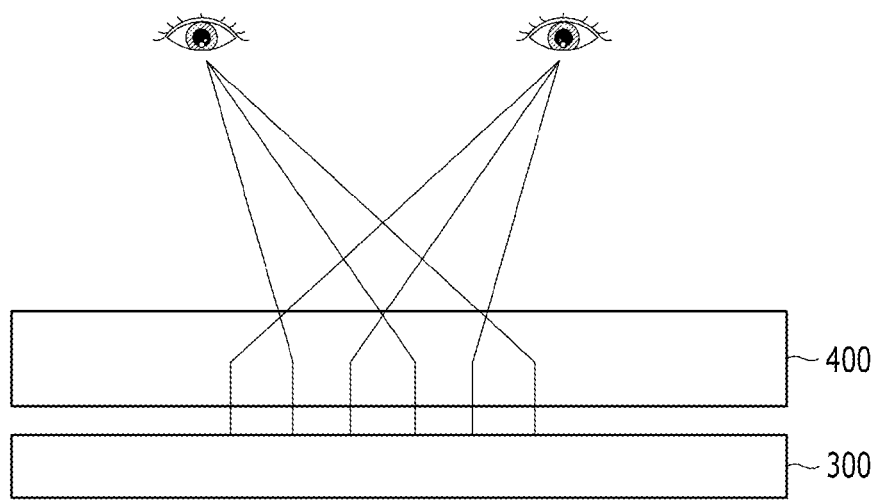

FIGS. 1 and 2 are schematic views illustrating a configuration of an image display device according to an exemplary embodiment and methods of forming a 2D image and a 3D image, respectively.

Referring to FIGS. 1 and 2, an image display device includes a display panel 300 displaying images, and a diffractive element 400 positioned in front of an image display surface of the display panel 300. The display panel 300 and the diffractive element 400 may operate in a 2D mode or a 3D mode.

The display panel 300 may be any one of various types of flat panel displays, such as a plasma display panel (PDP), a liquid crystal display (LCD), an organic light emitting diode (OLED) display, etc. The display panel 300 includes a plurality of pixels PX which are arranged in a matrix and display an image. In the 2D mode, the display panel 300 displays one 2D image. However, in the 3D mode, the display panel 300 may alternately display images corresponding to various visual fields, such as right eye images, left eye images, etc., by a space or time division method. For example, the display panel 300 may alternately display right eye images and left eye images every other pixel column in the 3D mode.

In the 2D mode, the diffractive element 400 transmits an image displayed on the display panel 300 as it is, but in the 3D mode, it divides visual fields of the image of display panel 300. That is, the diffractive element 400 operating in the 3D mode focuses multiple viewpoint images, including the left eye image and the right eye image displayed on the display panel 300, on visual fields corresponding to each viewpoint image by using the diffraction and refraction phenomenon of light.

FIG. 1 shows a case where the display panel 300 and the diffractive element 400 operate in the 2D mode in which the same image reaches the left eye and the right eye such that a 2D image is perceived, and FIG. 2 shows a case where the display panel 300 and the diffractive element 400 operate in the 3D mode in which the diffractive element 400 divides an image including an image for left eye and an image for right eye of the display panel 300 into individual visual fields such as the left eye and the right eye and diffracts the image such that a 3D image is perceived.

Figure 3:
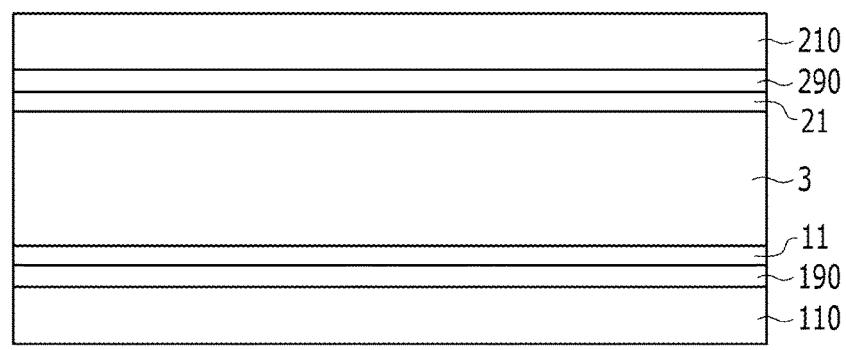
FIG. 3 is an example of a cross-sectional view of the diffractive element of the image display device according to the exemplary embodiment.

FIG. 3 is an example of a cross-sectional view of the diffractive element of the image display device according to the exemplary embodiment.

Referring to FIG. 3, the diffractive element 400 includes a first substrate 110 and a second substrate 210 facing each other, and a liquid crystal layer 3 interposed between the two substrates 110 and 210. The first substrate 110 and the second substrate 210 are made of an insulating material such as glass, plastic, etc. On outside surfaces of the substrates 110 and 210, polarizers (not shown) may be provided.

On the first substrate 110, a first electrode layer 190 and an alignment layer 11 are sequentially formed, and on the second substrate 210, a second electrode layer 290 and an alignment layer 21 are sequentially formed.

The first electrode layer 190 and the second electrode layer 290 include a plurality of electrodes and may be made of a transparent conductive material such as ITO (indium tin oxide) or IZO(indium zinc oxide). When voltages are applied to the first electrode layer 190 and the second electrode layer 290, an electric field is formed across the liquid crystal layer 3 according to applied voltages to control the alignment of liquid crystal molecules of the liquid crystal layer 3.

The alignment layers 11 and 21 determine the initial alignment of the liquid crystal molecules of the liquid crystal layer 3. Because the alignment layers 11 and 21 determine the arrangement direction of the liquid crystal molecules before voltages are applied, once voltages are applied, the liquid crystal molecules are quickly arranged according to the electric field formed in the liquid crystal layer 3.

The liquid crystal layer 3 may be aligned in various modes such as a horizontal alignment mode, a vertical alignment mode, TN (twisted nematic) mode, etc.

The diffractive element 400 operates in the 2D mode or the 3D mode according to voltages applied to the first electrode layer 190 and the second electrode layer 290. For example, when voltages are not applied to the first electrode layer 190 and the second electrode layer 290, the diffractive element 400 may operate in the 2D mode. When, on the other hand, voltages are applied to the first electrode layer 190 and the second electrode layer 290, the diffractive element 400 may operate in the 3D mode. To this end, the initial orientation direction of the liquid crystal molecules and the transmissive axis directions of the polarizers may be appropriately adjusted.

Hereinafter, the diffractive element 400 operating in the 3D mode will be described.

The diffractive element 400 operating in the 3D mode includes a plurality of unit lenses. The plurality of unit lenses may be repeatedly arranged in one side direction of the diffractive element 400 at predetermined intervals. The positions of the unit lenses in the diffractive element 400 may be fixed or vary with time.

Each unit lens may be implemented as a Fresnel zone plate. A Fresnel zone plate is a device functioning as a lens by using a plurality of concentric circles which are radially arranged and in which intervals therebetween decrease from the center to the outside, as Fresnel zones. A Fresnel zone plate uses the diffraction phenomenon of light, instead of the refraction phenomenon of light, to focus light.

Figure 4:
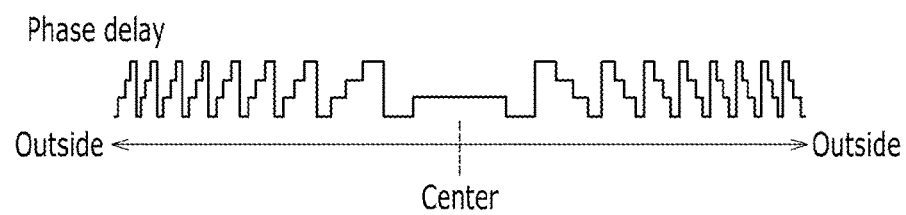
FIG. 4 is a graph illustrating a phase delay change according to the position of a phase modulation type of Fresnel zone plate.

FIG. 4 is a graph illustrating, for a phase modulation type of Fresnel zone plate, changes in phase delay according to the position along the plate. Here, each zone of the Fresnel zone plate is an area in which each repeated waveform in the graph is located.

Referring to FIG. 4, in each zone, the phase delay changes in a step-wise fashion. In the zone positioned about the center, the phase delay changes in two stages. In the other zones positioned outside of the center zone, the phase delay changes in four stages. However, FIG. 4 is not intended to limit the number of stages in which the phase delay changes, and various numbers of stages may be used.

The Fresnel zone plate shown in FIG. 4, in which the phase delay in each zone changes in the step-wise fashion, is referred to a multi-level phase modulation zone plate. To gather light passing through the multi-level phase modulation zone plate to a focus position, the diffractive element diffracts light passing through the individual zones, and through the diffraction and the destructive and constructive interference of the light, it is focused. As described above, it is possible to create a lens effect by forming a phase delay distribution according to the Fresnel zone plate for each unit lens of the diffractive element 400.

Figure 5:
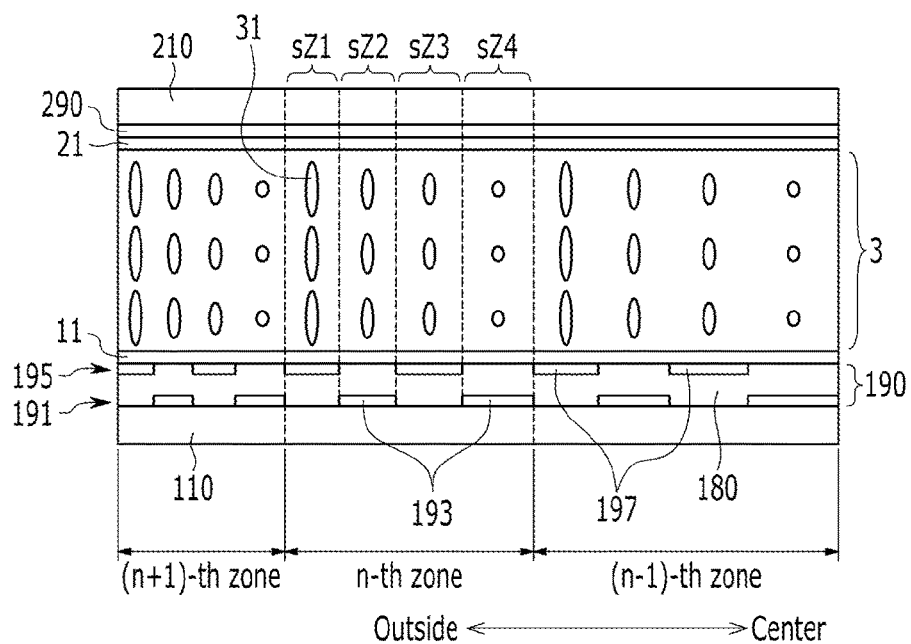
FIG. 5 is a cross-sectional view illustrating a portion of a unit lens of the diffractive element according to the exemplary embodiment.

FIG. 5 is a cross-sectional view illustrating a portion of a unit lens of the diffractive element 400 according to the exemplary embodiment. The identical components with those in the exemplary embodiment of FIG. 3 are denoted by the same reference numerals, and the same description is omitted.

Referring to FIG. 5, the diffractive element 400 includes the first substrate 110 and the second substrate 210 facing each other, and the liquid crystal layer 3 interposed between the two substrates 110 and 210. On the first substrate 110, the first electrode layer 190 and the alignment layer 11 are sequentially formed, and on the second substrate 210, the second electrode layer 290 and the alignment layer 21 are sequentially formed.

The first electrode layer 190 includes a first electrode array 191 including a plurality of first electrodes 193, an insulating layer 180 formed on the first electrode array 191, and a second electrode array 195 formed on the insulating layer 180 and including a plurality of second electrodes 197.

The first electrodes 193 and the second electrodes 197 may be alternately positioned in a horizontal direction and may be arranged so that they do not overlap each other. FIG. 5 shows that the edges of the first electrodes 193 and the second electrodes 197 neighboring each other do not overlap each other, however, the edges may partially overlap each other.

The horizontal widths of the first electrodes 193 and the second electrodes 197, the horizontal intervals between the first electrodes 193, and the horizontal intervals between the second electrodes 197 gradually decrease from the center of the unit lens to the outside of the unit lens, becoming smaller in the individual zones that are farther from the center. In each zone of the unit lens, such as the (n−1)-th zone, the n-th zone, and the (n+1)-th zone illustrated in FIG. 5, two first electrodes 193 and two second electrodes 197 are positioned. An area in each zone where each of the electrodes 193 and 197 is positioned forms a subzone, such as subzones sZ1, sZ2, sZ3, or sZ4. In the subzone reference symbols for the zone, sZ1, sZ2, sZ3, and sZ4 are sequentially denoted in increasing order going from the outside to the center. FIG. 5 shows one zone including four subzones sZ1, sZ2, sZ3, and sZ4, but the number of subzones is not limited thereto. Also, unlike what is shown in FIG. 5, the horizontal widths of the first electrodes 193 and the second electrodes 197 included in one zone may be constant, and the numbers of electrodes 193 and 197 included in the individual zones may decrease toward the outermost zone.

In every zone, the horizontal widths of the first electrodes 193 and the second electrodes 197 may be greater than or equal to a cell gap of the liquid crystal layer 3. However, the amount that the cell gap may be reduced is limited, due to process limitations and limitations imposed by the refractive index of the liquid crystal.

The insulating layer 180 may be made of an inorganic material, an organic material, etc., and electrically insulates the first electrode array 191 and the second electrode array 195 from each other.

The second electrode layer 290 is formed on the entire surface of the second substrate 210 and receives a predetermined voltage such as a common voltage Vcom, etc. The second electrode layer 290 may be made of a transparent conductive material such as ITO, IZO, etc.

The alignment layers 11 and 21 may be rubbed in a longitudinal direction perpendicular to the width (horizontal) direction of the first electrode 193 and the second electrode 197 (a direction perpendicular to the plane of FIG. 5) or in a direction forming a predetermined angle with the width (horizontal direction. The rubbed directions of the alignment layer 11 and the alignment layer 21 may be opposite to each other.

The liquid crystal molecules 31 of the liquid crystal layer 3 may be initially aligned, before application of an electric field, in a direction parallel to the surfaces of the substrates 110 and 210, but the alignment mode of the liquid crystal layer 3 is not limited thereto. Vertical alignment and other alignment modes are possible.

Figure 6:
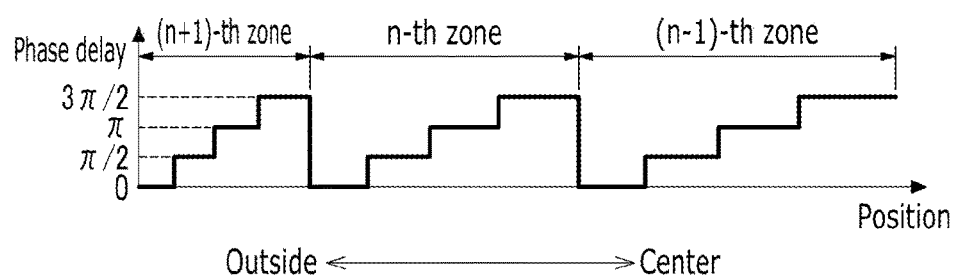
FIG. 6 is a view illustrating a phase delay which should be achieved according to the position in the diffractive element of FIG. 5 according to the exemplary embodiment.

FIG. 6 is a view illustrating the phase delay which should be achieved according to position in the diffractive element of FIG. 5. In this case, each unit lens of the diffractive element is implemented as the phase modulation type of Fresnel zone plate.

Referring to FIG. 6, in each of the (n−1)-th zone, the n-th zone, and the (n+1)-th zone of the unit lens, the phase delay changes in four stages. In each of the plurality of zones, the phase delay increases in the step-wise fashion from the outside to the center (as shown in FIG. 4). The same subzones of the plurality of zones cause the same phase delay. At the zone boundaries, the slope of the phase delay with respect to the base of the lens unit is vertical.

To achieve the illustrated phase delays according to the position in the diffractive element, voltages applied to the diffractive element are adjusted. However, it is difficult to make the slope of the phase delay vertical at the zone boundaries. In particular, it is difficult to control the phase delay at a zone boundary portion. In order to facilitate a phase delay control, the cell gap of the liquid crystal layer should be reduced. However, the amount that the cell gap may be reduced is limited, due to process limitations and limitations imposed by the refractive index of the liquid crystal.

Figure 7:
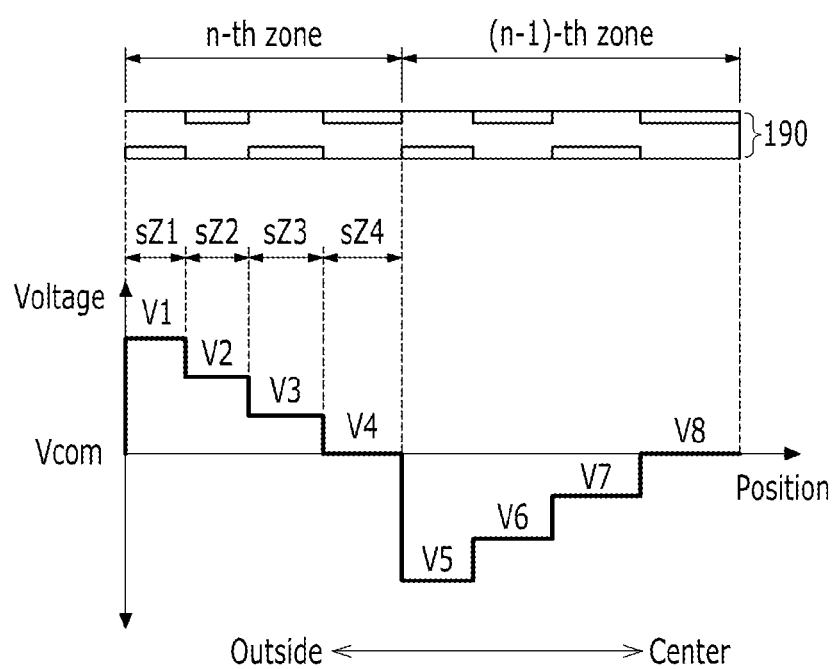
FIG. 7 is a view illustrating examples of voltages applied to a first electrode layer of a diffractive element in an image display device according to a first exemplary embodiment.
Figure 8:
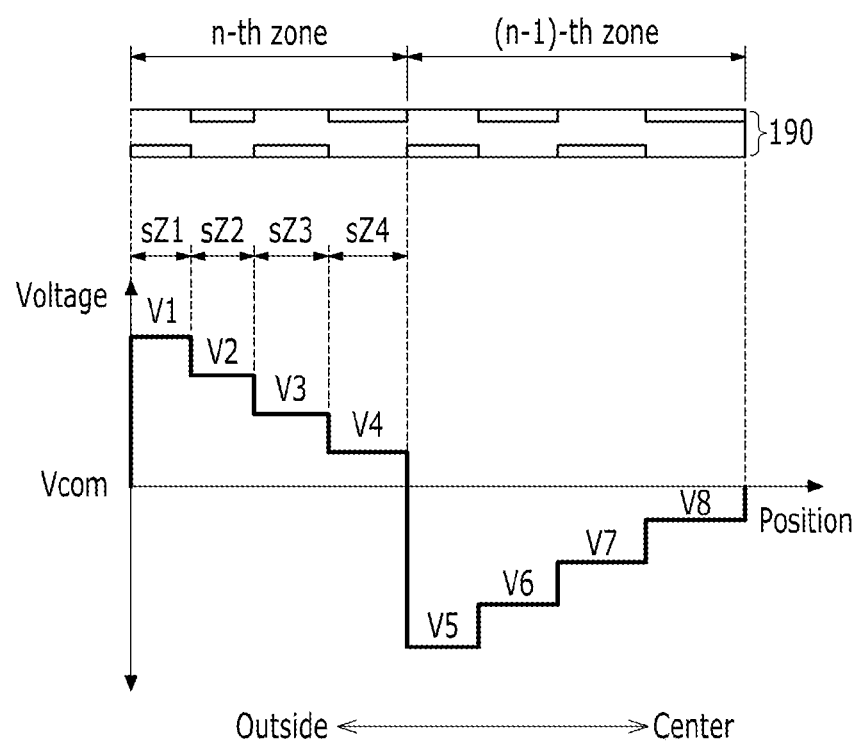
FIG. 8 is a view illustrating examples of voltages applied to a first electrode layer of a diffractive element in an image display device according to a second exemplary embodiment.
Figure 9:
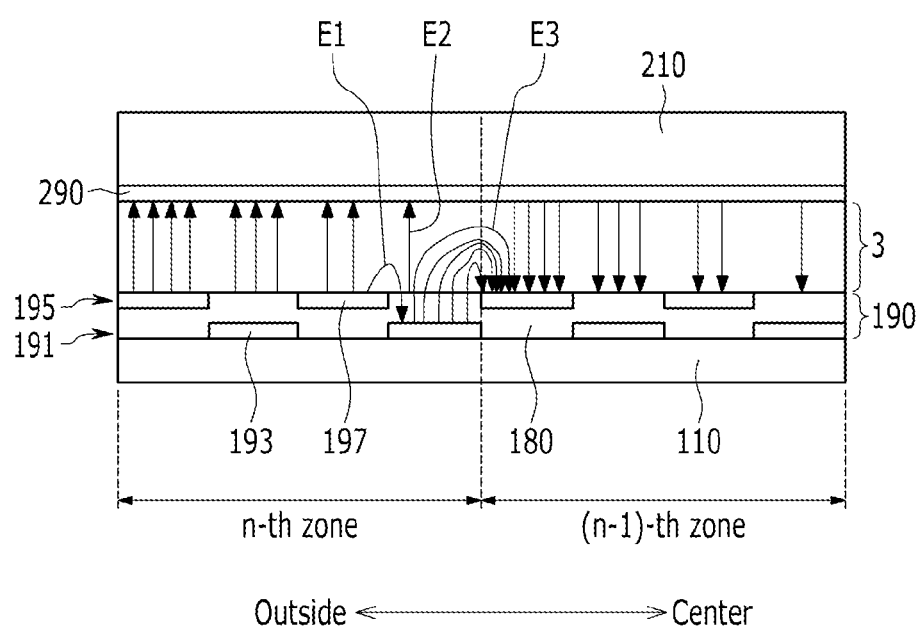
FIG. 9 is a view illustrating electric fields formed in a diffractive element when the voltages are applied to a first electrode layer of the diffractive element as in FIG. 8.
Figure 10:
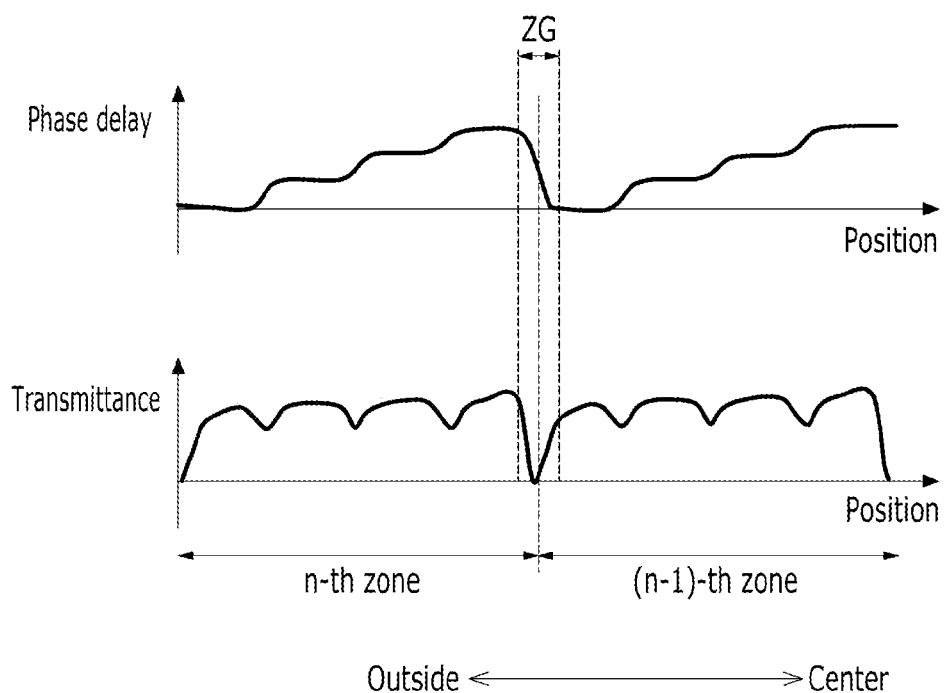
FIG. 10 is a view illustrating a phase delay and transmittance according to the position in the diffractive element of FIG. 9.

FIG. 7 is a view illustrating examples of voltages applied to the first electrode layer 190 of a diffractive element 400 in an image display device according to a first exemplary embodiment, FIG. 8 is a view illustrating examples of voltages applied to a first electrode layer 190 of a diffractive element 400 in an image display device according to a second exemplary embodiment, FIG. 9 is a view illustrating electric fields formed in the diffractive element when the voltages are applied to the first electrode layer 190 of the diffractive element 400 as in FIG. 8, and FIG. 10 is a view illustrating a phase delay and transmittance according to the position in the diffractive element 400 of FIG. 9. The identical components with those in the exemplary embodiment of FIG. 5 are denoted by the same reference numerals, and redundant description is omitted.

Referring to FIGS. 7 and 8, voltages having positive polarity with respect to the common voltage Vcom are applied to the n-th zone of the unit lens of the diffractive element, and voltages having negative polarity with respect to the common voltage Vcom are applied to the (n−1)-th zone of the unit lens. The common voltage Vcom is applied to the second electrode layer 290 of the diffractive element (see FIG. 5).

As described above, the polarity of the voltages applied to the first electrode layer 190 with respect to the common voltage Vcom (hereinafter, "the polarity of the voltages applied to the first electrode layer with respect to the common voltage" is simply referred to as "the polarity of the voltages applied to the first electrode layer") is inverted every zone. Such inversion of the polarity of the voltages is referred to as a spatial inversion of the polarity of the voltage.

A temporal inversion of the polarity of the voltage may occur with the spatial inversion, so a positive voltage changes periodically to a negative voltage and a negative voltage changes periodically to a positive voltage.

The first electrode layer 190 of each zone receives step-wise voltages in which the differences from the common voltage Vcom gradually decrease from the outside to the center within each zone. Hereinafter, voltages applied to the subzones sZ1, sZ2, sZ3, and sZ4 of the n-th zone and the (n−1)-th zone are denoted by reference symbols V1, . . . , and V8 in order from the outside to the center.

In the case where the polarity of the voltages of the n-th zone is positive and the polarity of the voltages of the (n−1)-th zone is negative, the voltages V1 to V8 can satisfy the following Equation with respect to the common voltage Vcom.

$$P(V1-V\text{com})=P(V5-V\text{com})$$

$$P(V2-V\text{com})=P(V6-V\text{com})$$

$$P(V3-V\text{com})=P(V7-V\text{com})$$

$$P(V4-V\text{com})=P(V8-V\text{com}) \quad \text{[Equation 1]}$$

Here, P(V) means the phase delay which light of a specific single wavelength vertically incident to the liquid crystal layer undergoes when passing through the liquid crystal layer at the position of that electrode when voltage, which is the voltage difference between the electrode and the common electrode, is applied. The phase change of the light is due to realignment of liquid crystal molecules on each electrode as the result of the voltage difference between the electrode and the common electrode.

A difference between the common voltage Vcom and the center side voltage V4 or V8 applied to the electrode closest to the center of each zone is referred to as an offset voltage Voffset (Voffset=V4−Vcom or Vcom−V8). In FIG. 7, the offset voltage Voffset is 0. However, the offset voltage Voffset can be adjusted as FIG. 8, and the offset voltage Voffset may differ according to the positions of the zones even in one unit lens.

A voltage difference between the voltages V4 and V5 applied to two electrodes adjacent to the zone boundary (dV=V4−V5) may be set by a difference between the outside voltage V1 or V5 applied to the electrode closest to the outside and the center side voltage V4 or V8 applied to the electrode closest to the center in each zone (dVmax=V1−V4 or V8−V5) and the offset voltage Voffset, and the voltage difference dV may differ according to the positions of the zones even in one unit lens.

The voltage difference between the voltages V4 and V5 applied to two electrodes adjacent to the zone boundary (dV=V4−V5) can satisfy the following Equation.

$$dV=dV\text{max}+2V\text{offset} \quad \text{[Equation 2]}$$

In FIG. 7, the offset voltage Voffset is 0 and thus dV=dVmax can be satisfied.

Referring to FIG. 9, electric fields (indicated by the arrows) are formed between the first electrode layer 190 and the second electrode layer 290, and an electric field is formed between two electrodes adjacent to the zone boundary.

Because voltages having positive polarity with respect to the common voltage Vcom are applied to the n-th zone of the unit lens and voltages having negative polarity with respect to the common voltage Vcom are applied to the (n−1)-th zone, the direction of the electric fields in the n-th zone and the direction of the electric fields in the (n−1)-th zone are opposite to each other.

In each zone, the intensities of the electric fields formed between the first electrode layer 190 and the second electrode layer 290 decrease from the outside to the center (as represented by fewer arrows as the intensity of the electric field decreases). This is because the differences between the voltages applied to the first electrode layer 190 and the common voltage Vcom decrease from the outside to the center.

A first electrode 193 of the n-th zone closest to the center forms a first electric field E1 together with an adjacent second electrode of the n-th zone, forms a second electric field E2 together with the second electrode layer 290, and forms a third electric field E3 together with an adjacent second electrode 197 of the (n−1)-th zone. In this case, because a voltage difference between the first electrode 193 of the n-th zone closest to the center and the adjacent second electrode 197 of the (n−1)-th zone is largest, the intensity of the third electric field E3 is higher than the intensities of the other electric fields E1 and E2.

Referring to FIG. 10, as shown in FIG. 6, in the n-th zone and the (n−1)-th zone, the phase delay changes in four stages. Therefore, the diffractive element can form a phase delay distribution according to the Fresnel zone plate so as to create a lens effect.

In FIG. 6, the slope of the phase delay at the zone boundaries is vertical. However, in FIG. 10, the slope of the phase delay at a zone boundary portion ZG is not vertical. Because it is difficult to control the phase delay in the zone boundary ZG, in the zone boundary portion ZG, the phase delay which should be achieved for a lens function is not properly implemented. The polarity of the voltages to the first electrode layer 190 is inverted every zone as shown in FIG. 8, such that the electric field E3 is formed at the boundary of zones adjacent to each other and the liquid crystal molecules of the liquid crystal layer 3 are aligned according to the electric field E3, so as to reduce the transmittance in the zone boundary portion ZG.

In the first electrode layer 190, the voltage difference dV between the voltages applied two electrodes adjacent to each other at the zone boundary may be set so that the transmittance of the zone boundary portion ZG is equal to or less than a predetermined value.

The transmittance reduction can act as amplitude grating. However, because degradation of lens characteristics caused by a phase control defect is greater than an amplitude grating effect, as the transmittance of the zone boundary portion ZG is reduced, diffraction efficiency can increase.

Figure 11:
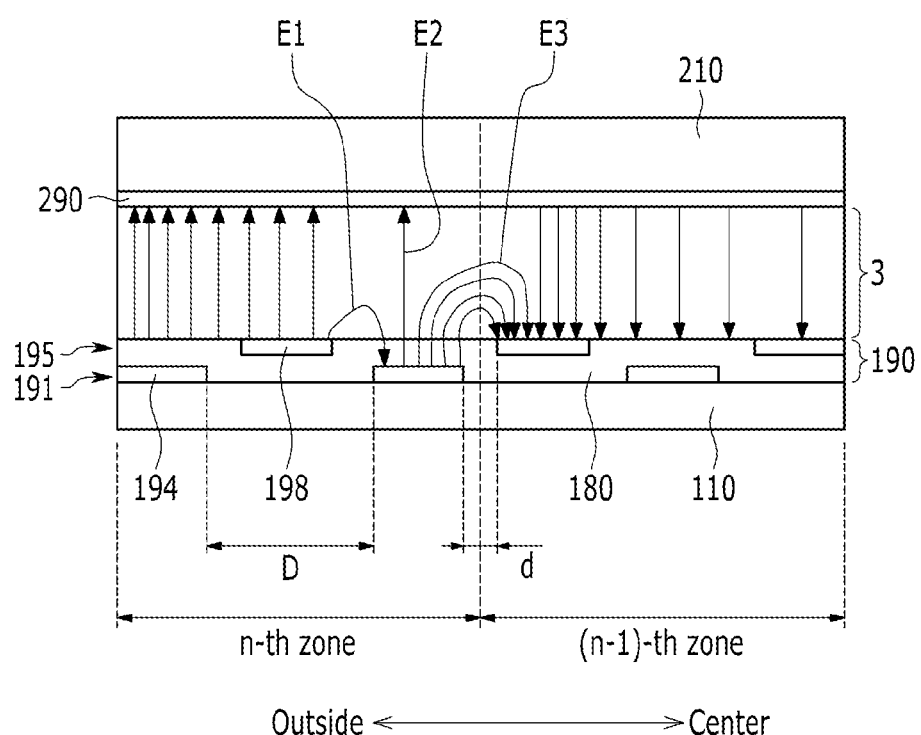
FIG. 11 is a view illustrating electric fields formed in the diffractive element in the image display device according to the second exemplary embodiment.
Figure 12:
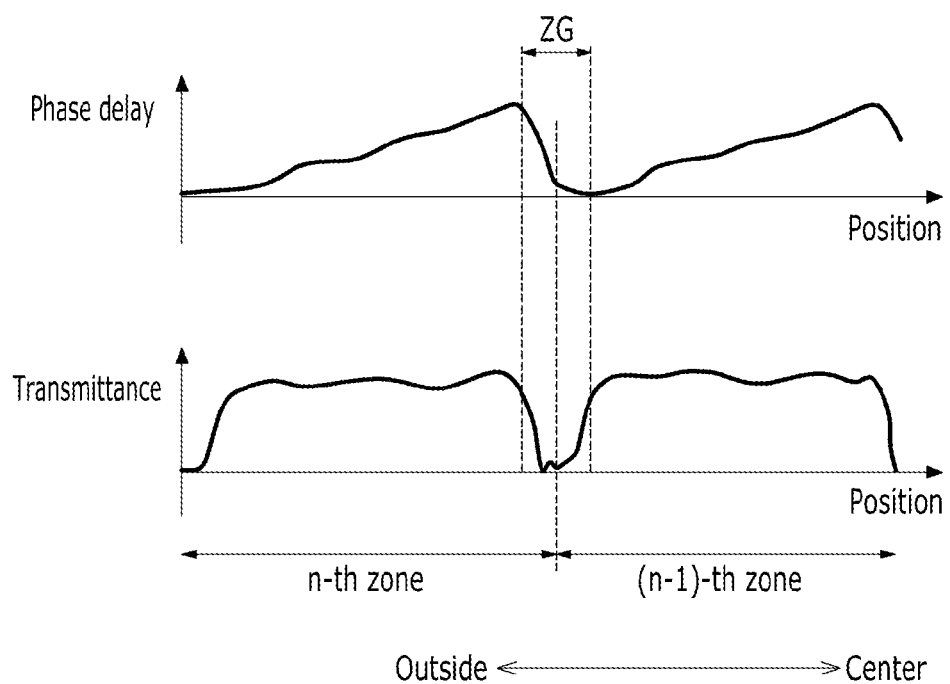
FIG. 12 is a view illustrating a phase delay and transmittance according to the position in the diffractive element in the case of FIG. 11.

FIG. 11 is a view illustrating electric fields formed in the diffractive element in the image display device according to another exemplary embodiment, and FIG. 12 is a view illustrating a phase delay and transmittance according to the position in the diffractive element in the case of FIG. 11. Identical components with those of the previous exemplary embodiment are denoted by the same reference numerals, and repetitive description is omitted.

A unit lens according to the exemplary embodiment of FIG. 11 is almost the same as the unit lens shown in FIG. 9, but is different from that shown in FIG. 9 in the configuration of the first electrode layer 190. In FIG. 9, in each zone, the first electrode layer 190 includes four electrodes. However, in FIG. 11, in each zone, the first electrode layer 190 includes three electrodes.

The first electrode layer 190 includes a first electrode array 191 including a plurality of first electrodes 194, an insulating layer 180 formed on the first electrode array 191, and a second electrode array 195 formed on the insulating layer 180 and including a plurality of second electrodes 198.

The polarity of the voltages applied to the first electrode layer 190 is inverted every zone as described above with respect to FIGS. 7 and 8. The first electrode layer 190 of each zone receives step-wise voltages in which the differences from the common voltage Vcom gradually decrease from the outside to the center. Voltages may be applied to electrodes corresponding to the same subzone for individual zones so that the phase delays at corresponding portions of the liquid crystal layer are the same.

The edges of the first electrode 194 and the second electrode 198 adjacent to each other may be arranged so as to not overlap each other. An interval d between two electrodes adjacent to each other at a zone boundary may increase as compared to the case of FIG. 9. Further, an electrode interval D which is the interval between the first electrodes 194 or the interval between the second electrodes 198 may also increase as compared to the case of FIG. 9.

An interval d between two electrodes adjacent to each other at a zone boundary, the electrode interval D, and the cell gap may be set so that a phase delay distribution necessary for a lens function of the diffractive element is formed while the transmittance of the zone boundary portion is equal to or less than a predetermined value.

As shown in FIG. 11, it is possible to increase the interval d between two electrodes adjacent to each other at the zone boundary and the electrode interval D, which can reduce manufacturing difficulties that can occur when processing minute electrodes and overlaying such electrode by reducing the number of electrodes included to the zones.

Referring to FIG. 12, in each zone, the phase delay increases from the outside to the center. Therefore, the diffractive element can form a phase delay distribution according to the Fresnel zone plate so as to create a lens effect.

Like FIG. 10, even in FIG. 12, the slope of the phase delay is not vertical at the zone boundary portion ZG. Because it is difficult to control the phase delay in the zone boundary ZG, in the zone boundary portion ZG, the phase delay which should be achieved for a lens function is not properly implemented. Because the polarity of the voltages applied to the first electrode layer 190 is inverted every zone as shown in FIG. 11, an electric field is formed at the boundary of zones adjacent to each other and the liquid crystal molecules of the liquid crystal layer 3 are aligned in a direction perpendicular to the electric field, so as to reduce the transmittance in the zone boundary portion ZG.

As described above, it is possible to provide an image display device capable of reducing the transmittance of the zone boundary portion and improving lens characteristics by inverting the polarity of the voltages every zone.

It is possible to control the voltage difference dV between the voltages applied to two electrodes adjacent to each other at the zone boundary through the offset voltage Voffset, which is the difference between the center side voltage applied to the electrode of each zone closest to the center and the common voltage. It is possible to control the degree of horizontal rotation of a director of the liquid crystal by controlling the voltage difference dV between the voltages applied to two electrodes adjacent to each other at the zone boundary. Because the transmittance of the diffractive element is influenced by the degree of horizontal rotation of the director of the liquid crystal, the transmittance of the zone boundary portion can be adjusted. This makes it possible to improve the liquid crystal lens characteristic of the diffractive element 400.

In the case where the polarity of the voltages is not inverted every zone, the phase delay distribution and the transmittance of the zone boundary portion are simultaneously determined by the cell gap and the voltages applied to the diffractive element. However, according to the embodiments, it is possible to independently control the phase delay distribution and the transmittance of the zone boundary portion. Therefore, a degree of freedom in selecting the cell gap increases. That is, it is unnecessary to reduce the cell gap to more than a limit.

Further, a degree of freedom of the horizontal width and pitch of the electrodes increases. Therefore, minute patterning and overlay error conditions are eased.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the disclosure, including the appended claims.

What is claimed is:

1. A method of driving an image display device, the image display device comprising:
   a display panel to display an image; and
   a diffractive element to operate in a 2D mode or a 3D mode, the diffractive element including:
      a first zone; and
      a second zone adjacent to the first zone,
      wherein each of the first and the second zones includes a plurality of subzones, wherein each of the subzones includes an electrode structure, an electrode layer, and a liquid crystal layer between the electrode structure and the electrode layer, and
   wherein a phase delay of light beams passing through the liquid crystal layer either gradually increases from a first value to a second value or gradually decreases from the second value to the first value across each of the first and second zones in the 3D mode;
   the method comprising:
      operating the diffractive element in the 3D mode including applying a common voltage to the electrode layers and applying voltages to the electrode structures,
      wherein a polarity of the voltage applied to the electrode structure of at least one of the plurality of subzones of the first zone with respect to the common voltage is different from a polarity of the voltage applied to the electrode structure of at least one of the plurality of subzones of the second zone with respect to the common voltage, wherein the voltage applied to the electrode structure of at least one of the plurality of subzones of the first zone and the voltage applied to the electrode structure of at least one of the plurality of subzones of the second zone are applied at the same time.

2. The method of claim 1, wherein:
the voltage applied to the electrode structure of one of the plurality of subzones of the first zone is the same as the voltage applied to the electrode structure of one of the plurality of subzones of the second zone.

3. The method of claim 1, wherein:
a polarity of the voltages applied to all electrode structures of the plurality of subzones of the first zone with respect to the common voltage is different from a polarity of the voltages applied to all electrode structures of the plurality of subzones of the second zone with respect to the common voltage.

4. The method of claim 1, wherein:
the operating of the diffractive element in the 3D mode includes operating the diffractive element having a plurality of unit lenses.

5. The method of claim 4, wherein:
each of the plurality of unit lenses operates as a Fresnel zone plate.

6. The method of claim 5, wherein:
each of the plurality of unit lenses includes a plurality of the zones sequentially positioned to the outside about a center of the unit lens.

7. The method of claim 1, wherein:
the diffraction element further comprises a first substrate and a second substrate,
wherein the electrode structures are disposed on a first surface of the first substrate and the electrode layers are disposed on a second surface of the second substrate, the first surface and the second surface facing each other.

8. The method of claim 1, wherein:
the electrode structures include at least one first electrode and at least one second electrode,
wherein an insulating layer is disposed between the at least one first electrode and the at least one second electrode.

9. The method of claim 1, wherein:
the voltages applied to the at least one first electrode and the at least one second electrode in each of the first and second zones changes across each zone in a step-wise fashion.

10. The method of claim 8, wherein:
the widths of the at least one first electrode and the at least one second electrode in each of the first and second zones increase across each zone.

11. The method of claim 8, wherein:
in each of the first and second zones, differences between the voltages applied to the at least one first electrode and the at least one second electrode and the common voltage gradually decrease across each zone.

12. The method of claim 11, wherein:
in the electrode structures, a voltage difference dV between voltages applied to two electrodes adjacent to each other at a boundary of the first and second zones is set by a difference dVmax between a first voltage applied to an electrode of each zone positioned closest to an outer position with respect to the center of the unit lens and a second voltage applied to an electrode of each zone positioned closest to a position nearest the center of the unit lens, and an offset voltage Voffset which is a difference between the second voltage and the common voltage.

13. The method of claim 12, wherein:
in the electrode structures, the voltage difference dV between voltages applied to the two electrodes adjacent to each other at the boundary of the first and second zones satisfies $$dV = dV\max + 2V\text{offset}.$$

14. The method of claim 11, wherein:
in the electrode structures, a voltage difference dV between voltages applied to two electrodes adjacent to each other at a boundary of first and second zones is set so that transmittance of a zone boundary portion becomes a predetermined value or less.

15. The method of claim 11, wherein:
an interval between two electrodes adjacent to each other at a boundary of the first and second zones and a cell gap are set so that transmittance of the boundary becomes a predetermined value or less.

16. The method of claim 8, wherein:
each of the first and second zones includes two first electrodes and two second electrodes, and the first electrodes are alternatively arranged with the second electrodes in each zone.

17. The method of claim 8, wherein:
each of the first and second zones includes two first electrodes and one second electrode or includes one first electrode and two second electrodes on the one first electrode.

18. The method of claim 17, wherein:
edges of a first electrode and a second electrode adjacent to each other do not overlap each other.

19. The method of claim 1, further comprising:
operating the diffractive element in the 2D mode so that the diffractive element transmits the image displayed on the display panel as it is.

20. The method of claim 1, wherein:
the electrode layers of the first zone is connected to the electrode layers of the second zone without a gap between them.

* * * * *